O. B. KNAPP.
Wind-Mills.
No. 142,400.                                Patented September 2, 1873.
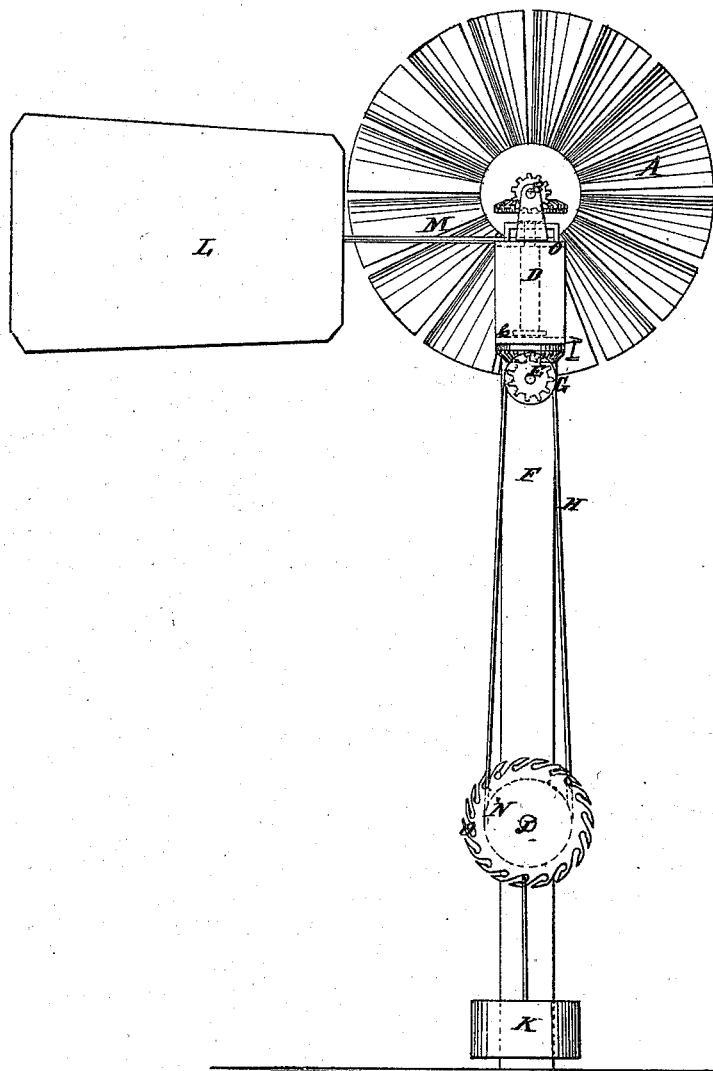
Witnesses:                                  Inventor:

UNITED STATES PATENT OFFICE.

OVETT B. KNAPP, OF BRANDON, WISCONSIN.

IMPROVEMENT IN WINDMILLS.

Specification forming part of Letters Patent No. 142,400, dated September 2, 1873; application filed April 26, 1873.

*To all whom it may concern:*

Be it known that I, OVETT B. KNAPP, of Brandon, in the county of Fond du Lac and State of Wisconsin, have invented a new and Improved Windmill, of which the following is a specification:

My invention is an improvement in the class of wheels with which a weight is so connected as to tend to keep them turned in a direction at right angles, or nearly so, to the direction of the wind at any given time; and the invention consists in the construction and arrangement hereinafter described and explicitly indicated in the claim.

The drawing is a side elevation of a wind-power apparatus such as I propose to make.

A is the spiral wind-wheel, which is mounted on the end of a horizontal shaft, B, which is mounted in bearings on the top of a turn-table, C, and gears with a vertical shaft, D, through which power or motion is communicated to the pump or other apparatus it is intended the wind-wheel shall operate. The turn-table C is supported on and secured to a bevel-gear, I, which meshes with a pinion, E, on the same horizontal shaft as the pulley G. A belt, H, connects pulley G with the axis J, which is to be turned by the weight K, for acting in conjunction with the vane L, for controlling the wheel, the vane being attached to the turn-table at one end of its arm M, in the plane of the wheel, or nearly so, so that its tendency is to turn the wheel out of the wind—that is, edgewise thereto—so as not to work, while the tendency of the weight is to turn it in to the wind. This weight is connected with the axis J through the medium of a hooked rod engaging with the curved teeth O of the disk N.

To start the wheel, the weight will be put on the disk at about the middle of its height, vertically, in case it is desired to obtain the full power. This will cause the wheel to turn about one-fourth of a revolution into the wind, in case the latter is not so strong as to prevent the weight from turning it too much. If it is not desired to obtain the full power, the weight will not be placed quite so high. By the use of the disk N for suspending the weight, the tendency of the weight to hold the wheel into the wind is made to increase as the wind presses the vane back, and to decrease as the weight turns the vane forward; for, when the weight is not on, the wind, by its action on the vane, turns the wheel edge to the wind, and when the weight is put on at the side of the disk it will fall to the bottom of the disk and turn the wheel at right angles to the direction in which the wind is blowing, and when the weight is at the bottom of the disk it offers but little resistance to the action of the wind on the vane; but, as the vane is pressed back, it raises the weight toward the side of the disk, where its resistance is greater, and, by the varied action of the weight in combination with the action of the wind on the vane, a more uniform action of the wheel is obtained.

Having thus described my invention, I claim as new and desire to secure by Letters Patent—

The combination, with the wheel A, turn-table C, and vane L, of the gear I, pinion E, belt H, pulleys, notched disk N, and weight K, as shown and described, to operate as specified.

OVETT B. KNAPP.

Witnesses:
R. C. KELLY,
J. N. SAFFROD.